US011172359B2

(12) United States Patent
Kunz et al.

(10) Patent No.: US 11,172,359 B2
(45) Date of Patent: Nov. 9, 2021

(54) METHOD AND APPARATUS FOR ATTACH PROCEDURE WITH SECURITY KEY EXCHANGE FOR RESTRICTED SERVICES FOR UNAUTHENTICATED USER EQUIPMENT

(71) Applicant: Lenovo (Singapore) Pte. Ltd., New Tech Park (SG)

(72) Inventors: Andreas Kunz, Ladenburg (DE); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 426 days.

(21) Appl. No.: 16/058,305

(22) Filed: Aug. 8, 2018

(65) Prior Publication Data

US 2019/0053049 A1  Feb. 14, 2019

Related U.S. Application Data

(60) Provisional application No. 62/543,178, filed on Aug. 9, 2017.

(51) Int. Cl.
*H04L 12/04* (2006.01)
*H04W 12/04* (2021.01)
(Continued)

(52) U.S. Cl.
CPC ........... *H04W 12/04* (2013.01); *H04L 9/0822* (2013.01); *H04L 9/30* (2013.01); *H04L 63/0428* (2013.01); *H04W 60/00* (2013.01); *H04L 63/064* (2013.01)

(58) Field of Classification Search
CPC ..... H04L 9/30; H04L 9/0822; H04L 63/0428; H04L 63/064; H04W 12/04; H04W 60/00
See application file for complete search history.

(56) References Cited

U.S. PATENT DOCUMENTS

2002/0166048 A1 * 11/2002 Coulier ............... H04L 63/0435
  713/169
2003/0026427 A1 * 2/2003 Couillard .............. H04L 9/0822
  380/277

(Continued)

FOREIGN PATENT DOCUMENTS

EP  2418878 A1 *  2/2012  ........ H04W 36/0038
EP  2418878 A1     2/2012
EP  2421287 A2     2/2012

OTHER PUBLICATIONS

LTE, General Packet Radio Service (GPRS) Enhancements for Evolved Universal Terrestrial Radio Access Network (E-UTRAN) Access, 3GPP ETSI TS 23.401 v12.6.0 Release 12 (Sep. 2014) (Year: 2014).*

(Continued)

*Primary Examiner* — Vance M Little
(74) *Attorney, Agent, or Firm* — Loppnow & Chapa; Matthew C. Loppnow (57) ABSTRACT

A method and apparatus provide for security for restricted local operator services. At least one of a restricted local operator services indication and security capabilities associated with the restricted local operator services can be sent. A non-access stratum key exchange request including a symmetric root key can be received. The symmetric root key can be encrypted with a public key. The non-access stratum key exchange request can be acknowledged. A non-access stratum security key can be derived with the symmetric root key. Radio interface keys for user plane and radio resource control can be derived with the symmetric root key.

18 Claims, 8 Drawing Sheets

(51) Int. Cl.
*H04L 29/06* (2006.01)
*H04W 60/00* (2009.01)
*H04L 9/08* (2006.01)
*H04L 9/30* (2006.01)

(56) References Cited

U.S. PATENT DOCUMENTS

| | | | | |
|---|---|---|---|---|
| 2004/0008666 | A1* | 1/2004 | Hardjono | H04L 63/0869 370/352 |
| 2004/0153667 | A1* | 8/2004 | Kastelewicz | H04W 12/06 726/9 |
| 2005/0081036 | A1* | 4/2005 | Hsu | H04W 12/062 713/171 |
| 2006/0174102 | A1* | 8/2006 | Smith | H04L 12/281 713/150 |
| 2007/0204161 | A1* | 8/2007 | Isozaki | H04N 21/25875 713/171 |
| 2011/0010768 | A1* | 1/2011 | Barriga | H04W 12/04 726/11 |
| 2011/0026714 | A1* | 2/2011 | Thomas | G06F 21/606 380/278 |
| 2014/0068261 | A1* | 3/2014 | Malek | H04W 12/068 713/168 |
| 2014/0376414 | A1* | 12/2014 | Edge | H04L 29/06027 370/259 |
| 2016/0021635 | A1* | 1/2016 | Lee | H04W 12/08 455/411 |
| 2016/0330619 | A1 | 11/2016 | Suh | |
| 2017/0006469 | A1* | 1/2017 | Palanigounder | H04L 9/0891 |
| 2017/0094506 | A1* | 3/2017 | He | H04W 8/02 |
| 2018/0234469 | A1* | 8/2018 | Kim | H04L 65/105 |

OTHER PUBLICATIONS

3rd Generation Partnership Project, Technical Specification Group Services and System Aspects, Study on Provision of Access to Restricted Local Operator Services by Unauthenticated UEs, Stage 1, 3GPP Technical Report TR 22.820 v15.0.0 (Mar. 2017) (Year: 2017).*

Digital Cellular Telecommunications System (Phase 2+) Universal Mobile Telecommunications Systems (UMTIS: LTE, 3GPP Systems Architecture Evolution (SAE); Security Architecture ETSI TS 133.401 v9.8.0 (Oct. 2015) (Year: 2015).*

Herzog, PCT International Search Report, International application No. PCT/IB2018/001010, European Patent Office, Rijswijk, NL, dated Oct. 29, 2018.

Drevon, "Study on System enhancements for Provision of Access to Restricted Local Operator Services by Unauthenticated UEs", SP-170382, 3GPP TSG SA Meeting #76, West Palm Beach, Florida, USA, Jun. 7-9, 2017.

* cited by examiner

METHOD AND APPARATUS FOR ATTACH PROCEDURE WITH SECURITY KEY EXCHANGE FOR RESTRICTED SERVICES FOR UNAUTHENTICATED USER EQUIPMENT

BACKGROUND

1. Field

The present disclosure is directed to a method and apparatus for signaling on a wireless network. More particularly, the present disclosure is directed to a method and apparatus for an attach procedure with security key exchange for restricted services for unauthenticated User Equipment (UE).

2. Introduction

Presently, wireless communication devices, such as UE, communicate with other communication devices using wireless signals. In 3rd Generation Partnership Project (3GPP) a study item in document SP-170382 "New SID: Study on System enhancements for Provision of Access to Restricted Local Operator Services by Unauthenticated UEs (PAR-LOS)" was agreed. This study aims to fulfill the 3GPP SA1 requirements to provide UEs with network access to restricted local operator services even if they are not successfully authenticated. The ability to provide access to such local services has been available to U.S. operators, but only on a proprietary basis.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for security for restricted local operator services. According to a possible embodiment, at least one of a restricted local operator services indication and security capabilities associated with the restricted local operator services can be sent. A non-access stratum key exchange request including a symmetric root key can be received. The symmetric root key can be encrypted with a public key. The non-access stratum key exchange request can be acknowledged. A non-access stratum security key can be derived with the symmetric root key. Radio interface keys for user plane and radio resource control can be derived with the symmetric root key.

Embodiments also provide another method and apparatus for security for restricted local operator services. According to a possible embodiment, at least one of restricted local operator services indication, security capabilities associated with restricted local operator services, and a public key can be received. A symmetric root key can be created based on reception of the at least one of restricted local operator services indication. The security capabilities can be associated with the restricted local operator services, and the public key. A non-access stratum key exchange request including the symmetric root key can be sent. The symmetric root key can be encrypted with the public key.

Figure 1:
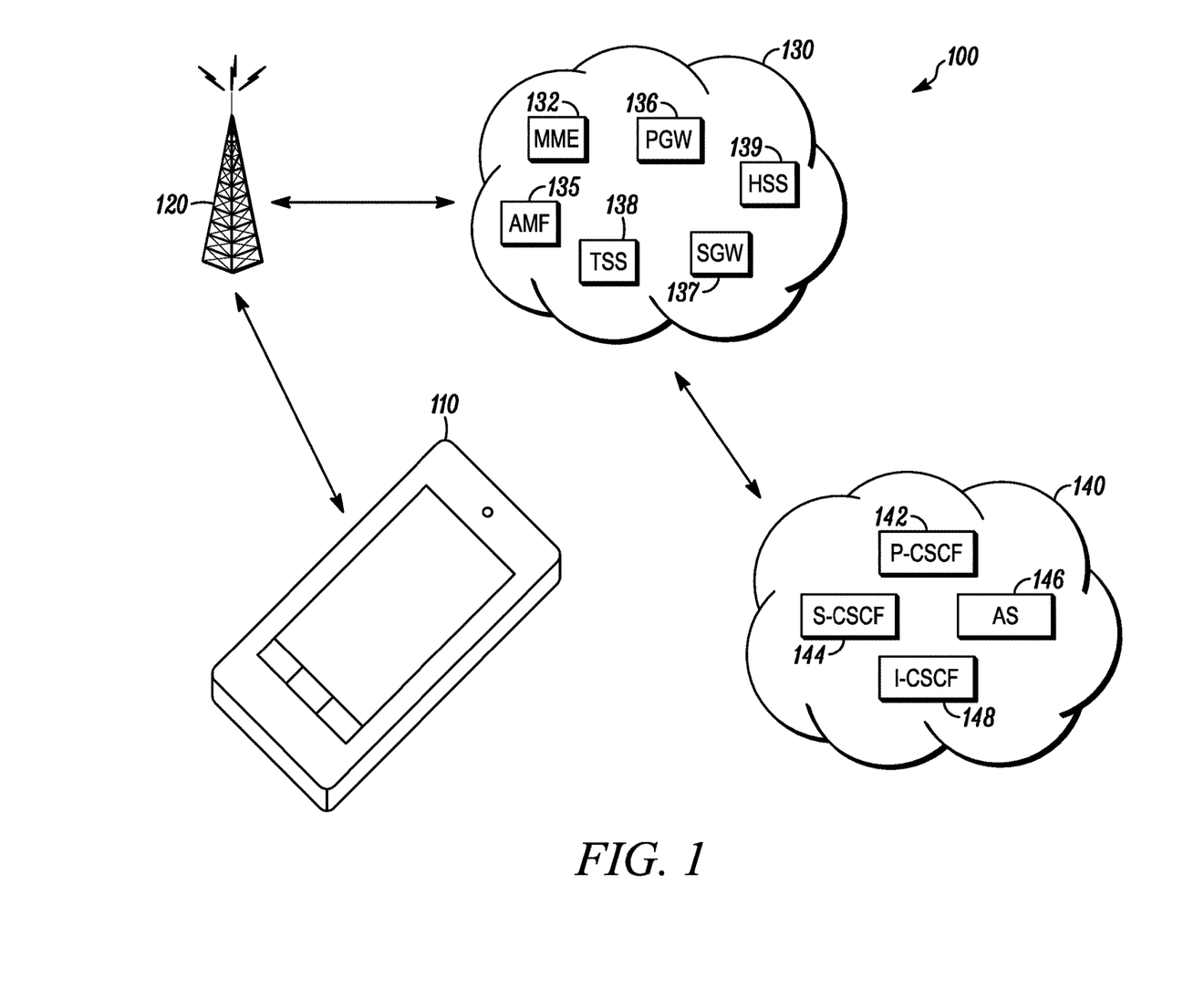
FIG. 1 is a block diagram of an example system, according to a possible embodiment.

FIG. 1 is an example block diagram of a system 100, according to a possible embodiment. The system 100 can include a User Equipment (UE) 110, a network entity 120, such as a base station, and a network 130, and an Internet Protocol (IP) Multimedia Core Network Subsystem (IMS) 140. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The network entity 120 can be a wireless wide area network base station, can be a NodeB, can be an enhanced NodeB (eNB), can be a New Radio NodeB (gNB), such as 5G NodeB, can be an unlicensed network base station, can be an access point, can be a base station controller, can be a network controller, can be a Transmission/Reception Point (TRP), and can be any network entity that can provide wireless access between the UE 110 and the network 130.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In operation, the UE 110 can communicate with the network 130 via the network entity 120. For example, the UE 110 can send and receive control signals on a control channel and user data signals on a data channel. The network 130 can also communicate with the IMS 140 that can include a Serving Call Session Control Function (S-CSCF) 144, an Interrogating Call Session Control Function (I-CSCF) 148, a Proxy Call Session Control Function (P-CSCF) 142, an Application Server (AS) 146. The network 130 can further include a Mobility Management Entity (MME) 132, a Temporary Subscriber Server (TSS) 138, and a Home Subscriber Server (HSS) 139.

In the following embodiments, the term eNB/ gNB can be used for the base station but the base station can be replaced by any other radio access node (RAN), such as an Access Point (AP), New Radio (NR) etc. Further, the proposed system 100 and methods described below can be applied to other types of networks including IEEE 802.11 variants, Global System for Mobile communication (GSM), General Packet Radio Services (GPRS), Universal Mobile Telecommunications Service (UMTS), LTE variants, Code Division Multiple Access (CDMA) 2000, Bluetooth, ZigBee, Sigfoxx, etc. The described embodiments can also be applicable to Next Generation Mobile Networks, see 3GPP TS 23.501 and 3GPP TS 23.502, where for example the MME 132 can map to an Access and Mobility Management Function (AMF) 135, and can partially map to the AMF 135 for terminating Non-Access Stratum (NAS) Sparse Mode (SM) protocol, Session Management Function (SMF)/User Plane Function (UPF) can map to a Serving Gateway (SGW) 137 or a Packet Data Network Gateway (PGW) 136, and the HSS 139 can map to a Unified Data Management (UDM)/ User Data Repository (UDR). The new logical functional entity TSS 138 can be standalone or can be collocated with the MME 132, the HSS 139 or an Authentication, Authorization, and Accounting (AAA) server, or even the AMF 135, SMF, UDM, UDR, or any other involved node in the network 130. In the following embodiments, the UE 110 can refer to a mobile device, but it could be also a Mobile Station (MS) without a Universal Mobile Telecommunications SIM (USIM) or Universal Subscriber Identify Module (USIM)/ SIM or a mobile equipment. The UE 110, MS, or Mobile Entity (ME), can be assumed to be preconfigured with a public and private key pair or can be capable of generating them based on an internal logic, when required.

The embodiments disclosed herein can fulfill the 3GPP requirements for security to provide the UE 110 with access to the network 130 to restricted local operator services even if the UE 110 is not successfully authenticated. The ability to provide access to such local services has been available to U.S. operators on a proprietary basis. However, the wide deployment of LTE and corresponding introduction of Voice over LTE (VoLTE) creates demand for a standardized mechanism to allow the UE 110 to access these services, such as dialing a particular digit string and accessing a captive portal, without necessarily being successfully authenticated for access.

The system 100 can allow the UE 110 that can be unauthenticated to access RLOS based on operator policy and regional regulatory requirements. The system 100 can identify an origination to restricted local operator services, such as dialed digits and captive portal. The system 100 can determine RLOS are available. The system 100 can allow access to restricted operator services by the unauthenticated UE 110. The system 100 can charge for information collection. The system 100 can account for security considerations. The embodiments provide a solution for the UE 110 to attach to the network 130 without any credentials of the network operator including the setup of a security relationship between the UE 110 and the network 130.

Current registration procedure in Evolved Packet System (EPS) as described in Technical Specification (TS) 23.401 [2] does not allow the attachment of the UE 110 without credentials of the network 130. If the network 130 cannot find a subscription for UE 110, such as the Serving GPRS Support Node (SGSN), the MME 132, or the AMF 135 cannot retrieve a subscription of the UE 110 from a Home Location Register (HLR) or the HSS 139, the Attach/ Registration request from the UE 110 can be rejected. Also, if the UE 110 is not able to provide the correct response to the challenge sent by the network 130, the UE 110 can be rejected for further signaling and any communication. The same concept applies also to the next generation system as specified in TS 23.501 [3].

In order to allow the UE 110 to access restricted operator services, and thus to perform a successful Attach procedure for restricted services only, the network 130 and the UE 110 would need to setup a certain level of security, although the network 130 does not have a subscription for the UE 110 and the UE 110 does not possess valid Universal Subscriber Identify Module (U)SIM credentials. Several enhancements and changes are required in order to provide also a minimum level of security, that is, confidentiality, of the communication between the UE 110 and the and the network 130.

The embodiments can setup security between the UE 110 and the network 130 without using a subscription of the UE 110 in the network 130 and without holding a valid (U)SIM credential(s) in the UE 110. This is based on exchange of a Public Key of the UE 110 and a Public Key of the network 130, such as the MME 132. Using the Public Keys, the UE 110 and the network 130 can derive further credentials for at least non-access stratum (NAS), access stratum (AS), Radio Resource Control (RRC) integrity protection, and/or confidentiality protection. AS can be interchangeably used with User Plane (UP) within the embodiments disclosed and can describe the connection for user data, such as Packet Data Units (PDUs), or IP packets, exchanged between the UE 110 and a network gateway, such as the PGW 136 or the UPF.

The RLOS and/or PARLOS can describe data services offered by a network operator for the UE 110 which do not have valid/enough subscription information for authentication. The RLOS can be, for example, IP connectivity to a specific portal or a voice service to a call center.

Figure 2:
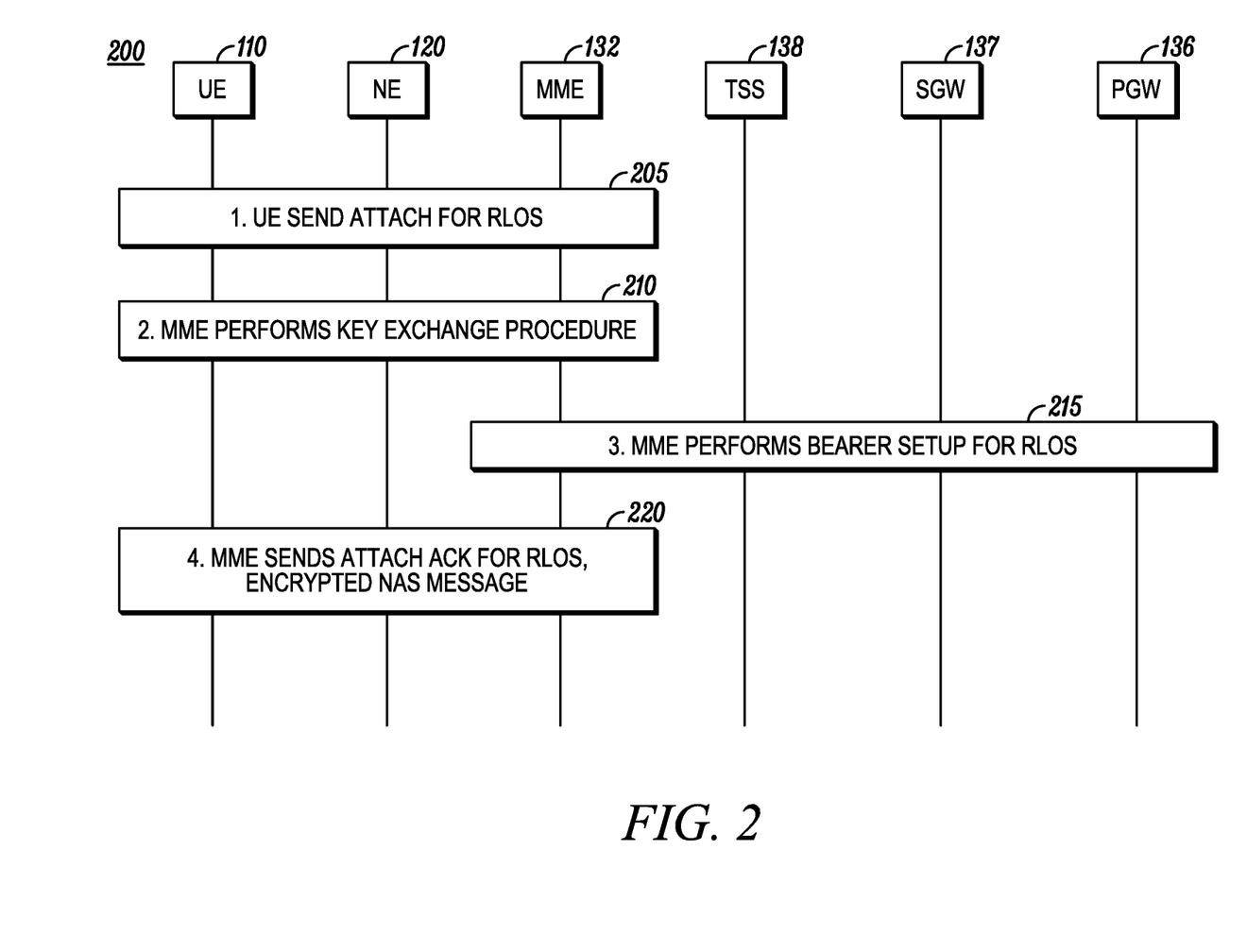
FIG. 2 is an example signal flow diagram of the example system of FIG. 1, according to a possible embodiment.

FIG. 2 illustrates an example signal flow diagram 200 of the example system of FIG. 1, according to a possible embodiment. In particular, FIG. 2 shows on a high level the two solution variants of either broadcasting a Public Key of the MME 132 and sending the Public Key of the UE 110 in the Attach procedure or exchanging the keys later in distinct messages. In 205, the UE 110 can not be attached to any public land mobile network (PLMN) and can not have any valid Universal Integrated Circuit Card (UICC)/USIM or can not have sufficient credentials to attach to any available PLMN. The UE 110 can perform selection of the PLMN and the UE 110 can initiate an Attach/Registration request for RLOS to this PLMN.

The UE 110 can send a NAS ATTACH, or Registration, request message to the MME 132 or the AMF 135. In a possible embodiment, the UE 110 can have received the Public Key of the MME 132 in a broadcast message or within Broadcasted System Information (SIB) and then can include the Public Key of the UE 110 in the NAS ATTACH message.

The UE 110 can include in the Attach request message an indication to the network 130 that the Attach procedure is for restricted services, such as a RLOS indication. Based on this RLOS indication, the network 130, such as the MME 132 or the AMF 135, can know that the UE 110 can not have a subscription profile in any HSS 139/HLR, which the network 130 can contact. In other words, the network 130 can determine that the UE 110 lacks any valid credentials, such as Keys, which would allow "normal" authenticated access to resources of the network 130, that is at least there can be no credentials available before the UE 110 is allowed IP access. On a higher level, such as an Application level, the UE 110 might have credentials, but the UE 110 can be used/exchanged once the UE 110 has obtained IP connectivity to restricted service(s). Based on the RLOS indication, the network 130, such as the MME 132 or the AMF 135, can determine that access to particular restricted service(s) is to be provided. Further, based on the RLOS indication the network 130 can determine how to handle the identifier of the UE 110, such as an Identification (ID) of the UE 110, from the Attach/Registration request message. The network 130 determines that the IF of the UE 110 provided by the UE 110 can not be used for subscription retrieval from the HSS 139/HLR/UDM. Instead, the network 130 can determine to initiate signaling for credentials exchange with the UE 110. The credentials can be later used for at least NAS, AS, RRC integrity protection, and/or confidentiality protection.

Figure 3A:
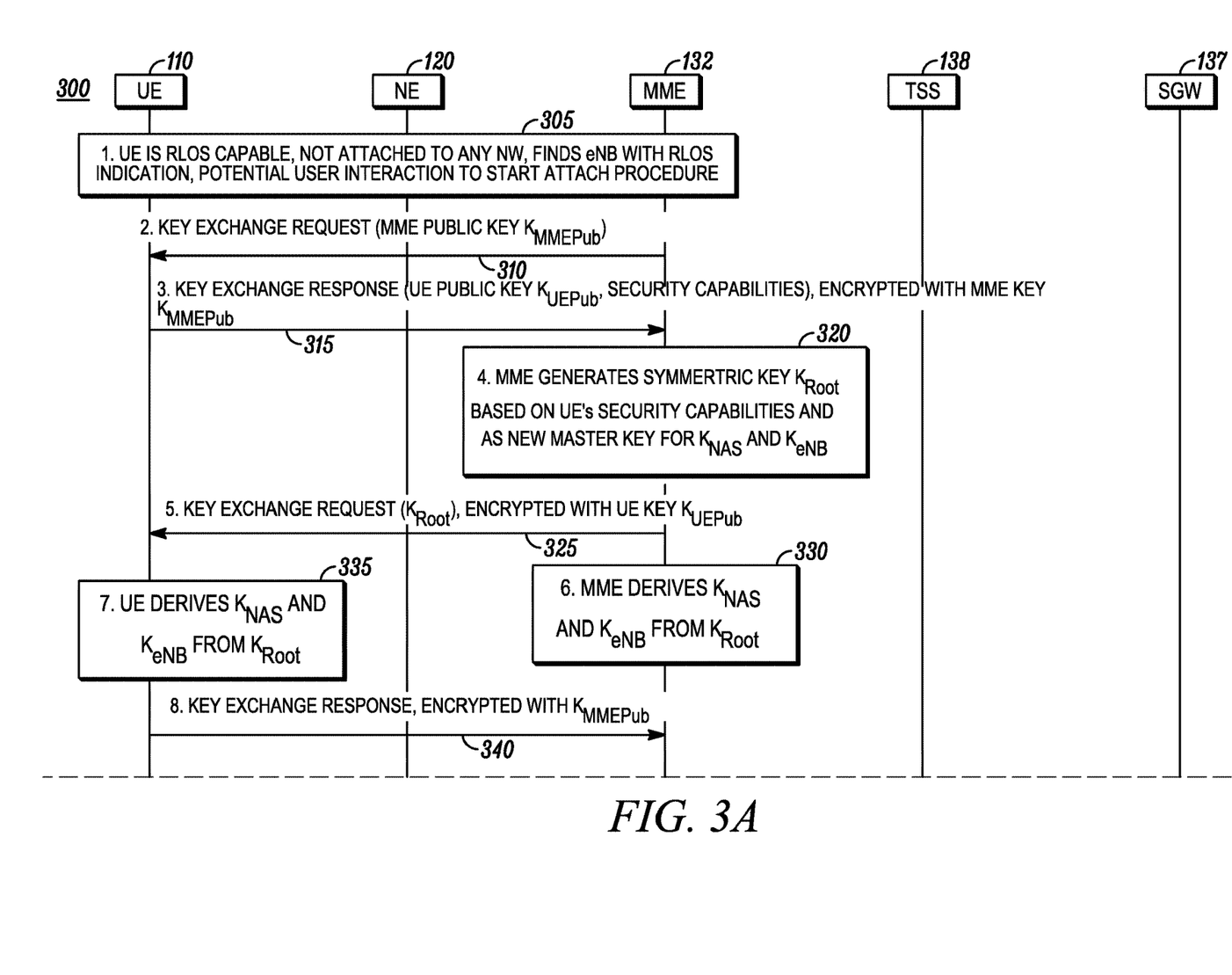
FIGS. 3A and 3B are another example signal flow diagram of the example system of FIG. 1, according to a possible embodiment.
Figure 3B:
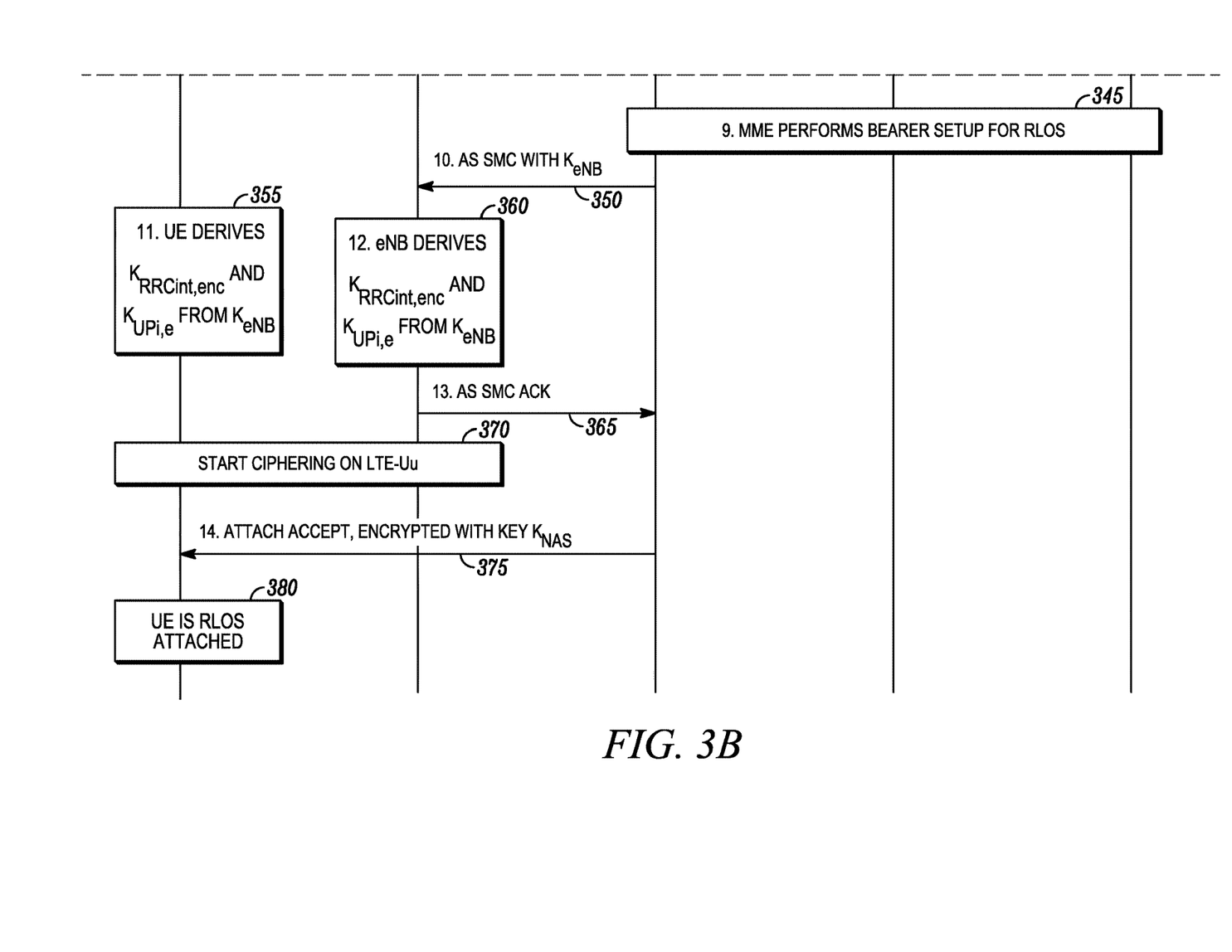

In 210, based on the received type or indication of the Attach request message, such as a RLOS attach procedure, if the Public Key of the MME 132 and the Public Key of the UE 110 are not exchanged as described in 205, then as per another embodiment in FIGS. 3A and 3B the two Public keys can be exchanged after the MME 132 received the NAS ATTACH request message. First the MME 132 can send a NAS message to the UE 110, including the Public Key of the MME 132 and the UE 110 can answer and provide the Public Key of the UE 110. The response message of the UE 110 can be already encrypted with the Public Key of the MME 132. In another embodiment and as described in FIGS. 3A and 3B in detail, a new symmetric key can be generated and exchanged encrypted with the Public Key. This new symmetric key can be used to derive other keys as well in the UE 110 and the MME 132 for encryption and integrity on the radio interface.

The signaling exchange in 210 can be based on NAS signaling protocol. A possible embodiment can use existing NAS Security Mode Command (SCM) messages and can enhance those messages with the related Public Key and symmetric key exchange for RLOS access. In another possible embodiment, new NAS messages can be defined for credentials exchange related to RLOS access.

In 215, the MME 132 can perform a bearer setup procedure, a Packet Data Network (PDN) connection establishment, or Protocol Data Unit (PDU) Session establishment, for RLOS towards other functional elements in the network 130, such as the SGW 137 and PGW 136, or towards SMF/UPF. Those functional elements can be specific for RLSO service, that is offering a restricted service.

The UE 110 can have provided, such as in 205, further indications to the network 130 for the type of RLOS access. The network 130, such as the MME 132, AMF 135, can take this indication into consideration while determining what type of RLSO bearer to setup.

In 220, the MME 132 can send an ATTACH accept message or a Registration accept message, encrypted with the Public Key of the UE 110 or encrypted with the symmetric key of the UE 110 derived for NAS security in 210. Upon successful setup of the PDN connection, PDU session, or bearer, in the network 130 with the SGW 137/PGW 136, the network 130 can provide Access Stratum (AS) security context for the UE 110 to the network entity 120. The network entity 120 can use this AS security context to establish a secure connection over a radio Uu interface.

While the procedure above can cover the two use cases described, the use case with broadcasting the Public Key of the MME 132 can have the assumption that there is only one dedicated MME 132 in the area and that the network entity 120 can always be selecting the same MME 132 for RLOS, otherwise there is a mismatch between Public Key of the MME 132 broadcasted and the Public Key of the MME 132 in the other MME 132.

In a possible embodiment, the key/credentials exchange can be performed in a separate procedure, as depicted in detail in FIGS. 3A and 3B. Nevertheless, the exchange of the symmetric key can be done in a similar way also when using the embodiment of broadcasting the Public Key of the MME 132 and sending the Public Key of the UE 110 in the Attach request.

FIGS. 3A and 3B is another example signal flow diagram 300 of the example system of FIG. 1, according to a possible embodiment. In 305, the UE 110 can not be attached to any PLMN and can not have any UICC/USIM, or no valid credentials to attach to any available PLMN. The UE 110 can perform PLMN selection and can perform unauthenticated attach to this PLMN. The UE 110 can send a NAS ATTACH request message, or Registration request, to the network 130, such as the MME 132 or the AMF 135. If the network entity 120 broadcasts the Public Key of the MME 132, then the UE 110 can include Public Key of the UE 110 in the NAS ATTACH request. The UE 110 can include in the Attach request message an indication to the network 130 that the Attach procedure is for restricted services, such as a RLOS indication, similar to 205 in the signal flow diagram 200 illustrated in FIG. 2.

Due to the RLOS access, the UE 110 can generate the Public Key of the UE 110. The UE 110 can include the Public Key of the UE 110 in the Attach request message to the network 130. Optionally, the UE 110 can include a pre-configured Public Key certificate. The network 130 can check the validity of the certificate of the security certificate of the UE 110, if such mechanism is enabled. The UE 110 can use in the ID field of the UE 110 in the Attached message either an empty filed or any arbitrary number. The ID of the UE 110 can not be used at the network 130 during this procedure, as there is no related subscription in the network 130. Thus, the MME 132 can not need to request the ID of the UE 110 in separate signaling, if the ID of the UE 110 in the Attached request message was empty.

In 310, the MME 132 can detect the request for RLOS and can not try to authenticate the UE 110 or check the HSS 139 for a subscription profile. The MME 132 can perform a Key Exchange Procedure, which may be similar to a NAS Security Mode Command (SMC) procedure, in case the Public Keys are not already exchanged, such as the Public Key of the MME 132 in broadcast and the Public Key of the UE 110 in NAS ATTACH. The MME 132 can send a NAS Key Exchange Request to the UE 110, including the Public Key of the MME 132. If the UE 110 has already included the Public Key of the UE 110 in the Attach request message, the MME 132 can use the Public Key of the UE 110 to integrity and confidentiality protect the Key Exchange Request message to the UE 110. Optionally, the network 130, such as the MME 132, can include a security certificate. If the UE 110 has been pre-configured with corresponding certificates, the UE 110 can check the certificate validity of the network 130.

In 315, the UE 110 can respond with a Key Exchange Response message including the Public Key of the UE 110 and the security capabilities of the UE 110. If the UE 110 has already provided the Public Key of the UE 110 in the Attach request message, the UE 110 can omit sending the UE Public Key in the Key Exchange Response message. This message can be encrypted with the Public Key of the MME 132. The Security capabilities of the UE 110 can include what kind of algorithms and Key Derivation Functions (KDFs) the UE 110 supports. The Public Key of the UE 110 and Private Key can be preconfigured in the UE 110 or can be generated ad-hoc in the UE 110.

In 320, the MME 132 can generate a new symmetric $K_{Root}$ key based on the security capabilities of the UE 110. This symmetric key can then be used as the new master/root key. There can be several possibilities on how the $K_{NAS}$ and $K_{eNB}$ keys can be derived from the $K_{Root}$ key. $K_{Root}$ key can be already the NAS $K_{NAS}$ key or the upper level $K_{ASME}$ key where $K_{NAS}$ key needs to be derived from. If $K_{Root}$ key is similar to $K_{ASME}$ key then the $K_{eNB}$ key can be derived in a similar way as in traditional Evolved Packet System (EPS) (see 33.401 [4]), while in case of $K_{Root}$ key can be similar to $K_{NAS}$ key, then $K_{eNB}$ key can be derived from $K_{NAS}$ key. The following procedure can assume that $K_{Root}$ key can be similar to $K_{ASME}$ key, but other options can be also possible.

Optionally, the UE 110 and the network 130 can exchange pre-configured public security certificates or identity certificates during the 315 and 320. Such certificates can be used by the network 130 and by the UE 110 to verify the validity and/or the ownership of the Public Keys. This can be used assuming that Public-Key Infrastructure (PKI) scheme is provided, such as can be also provisioned in the UE 110 by a manufacturer of the UE 110, or can be updated in the UE 110 via a software update when IP connectivity is available. The network 130, such as the MME 132 or the AAA server, can connect to a PKI authority to verify the certificate provided by the UE 110.

In 325, the MME 132 can provide the new root $K_{Root}$ key to the UE 110 in another NAS Key Exchange Request, encrypted with the Public Key of the UE 110, or if available encrypted with previously derived symmetric key.

In 330, the MME 132 can store the assigned $K_{Root}$ key and can derive the $K_{NAS}$ key and $K_{eNB}$ keys. The $K_{NAS}$ key can be used for integrity protection and confidentiality of the NAS protocol messages. The $K_{eNB}$ key can be used to further derive the keys for the AS and RRC in the network entity 120, as explained in 355. In 335, the UE 110 can store the assigned $K_{Root}$ key and can derive the $K_{NAS}$ key and $K_{eNB}$ key from $K_{Root}$ key. The usage of $K_{NAS}$ key and $K_{eNB}$ key is explained in 330. In 340, the UE 110 can respond to 325 with a Key Exchange Response message, which can be encrypted with the $K_{NAS}$ key. In 345, the MME 132 can perform a Bearer Setup procedure for RLOS towards the SGW 137/PGW 136, with FIGS. 3A and 3B showing only the SGW 137. The MME 132 can determine to perform 345 based on an indication from the UE 110 during 305. For example, the UE 110 can have indicated 'RLOS access' and/or some similar indication.

The MME 132 can derive a temporary ID of the UE 110 and can use this ID for the establishment of the PDN Connection, or PDU Session or bearer, with the SGW 137/PGW 136 in 345. The temporary ID of the UE 110 can have the format of International Mobile Subscriber Identity (IMSI) or Globally Unique Temporary Identity (GUTI). The other CN entities, such as the SGW 137 and the PGW 136 can use this temporary ID of the UE 110 as a reference for the PDN connection or bearer. For all subsequent signaling within the network 130, the temporary ID of the UE 110 can be used as reference. The temporary ID of the UE 110 can contain the ID of the MME 132, such as Globally Unique Mobility Management Entity Identifier (GUMMEI).

In 350, the MME 132 can send an Access Stratum Security Mode Command to the network entity 120, which can include the $K_{eNB}$. The MME 132 can include this message/command within the S1 UE Context Setup message which install the AS context in the network entity 120. The MME 132 and the network entity 120 can use the temporary ID of the UE 110 as reference in the singling exchange.

In 355, the UE 110 can derive from the key the $K_{eNB}$ key the $K_{RRCint}$ key, $K_{RRCenc}$ key, $K_{UPint}$ key, $K_{UPenc}$ key. In 360, the network entity 120 can derive from the $K_{eNB}$ key, the $K_{RRCint}$ key, $K_{RRCenc}$ key, $K_{UPint}$ key, and $K_{UPenc}$ key. In 365, the network entity 120 can acknowledge the AS SMC to the MME 132. In 370, ciphering can start on the LTE-Uu radio interface. In 375, the MME 132 can send the ATTACH ACCEPT message to the UE 110, encrypted with the $K_{NAs}$ key. The ATTACH ACCEPT message can contain a temporary ID of the UE 110, and optionally a permanent ID of the UE, assigned by the network 130. The UE 110 can use the temporary ID of the UE 110 at each consequent NAS request message during the registration for the RLOS. The MME 132 can use the temporary ID of the UE 110 to find Mobility Management (MM) context for the UE 110.

In 380, the UE 110 is now "RLOS Attached", that is the UE 110 has IP connectivity and can access the RLOS. The signaling between the UE 110 and the network 130, such as the MME 132 can be performed to exchange initial credentials, such as the Public Key of the UE 110 and the Public Key of the MME 132. Additionally, additional credentials, such as Root key or Master key, which can be a symmetric key can be exchanged between the UE 110 and the network 130. The additional credentials, such as the Root key or Master key, can be used autonomously in the UE 110 and in the network 130, such as in the MME 132 or in network entity 120 to determine "derived credentials" for corresponding integrity protection and/or confidentiality protection for NAS messages, such as NAS keys, RRC messages, such as RRC keys, and Access Stratum data, such as AS keys or UP keys.

Figure 4:
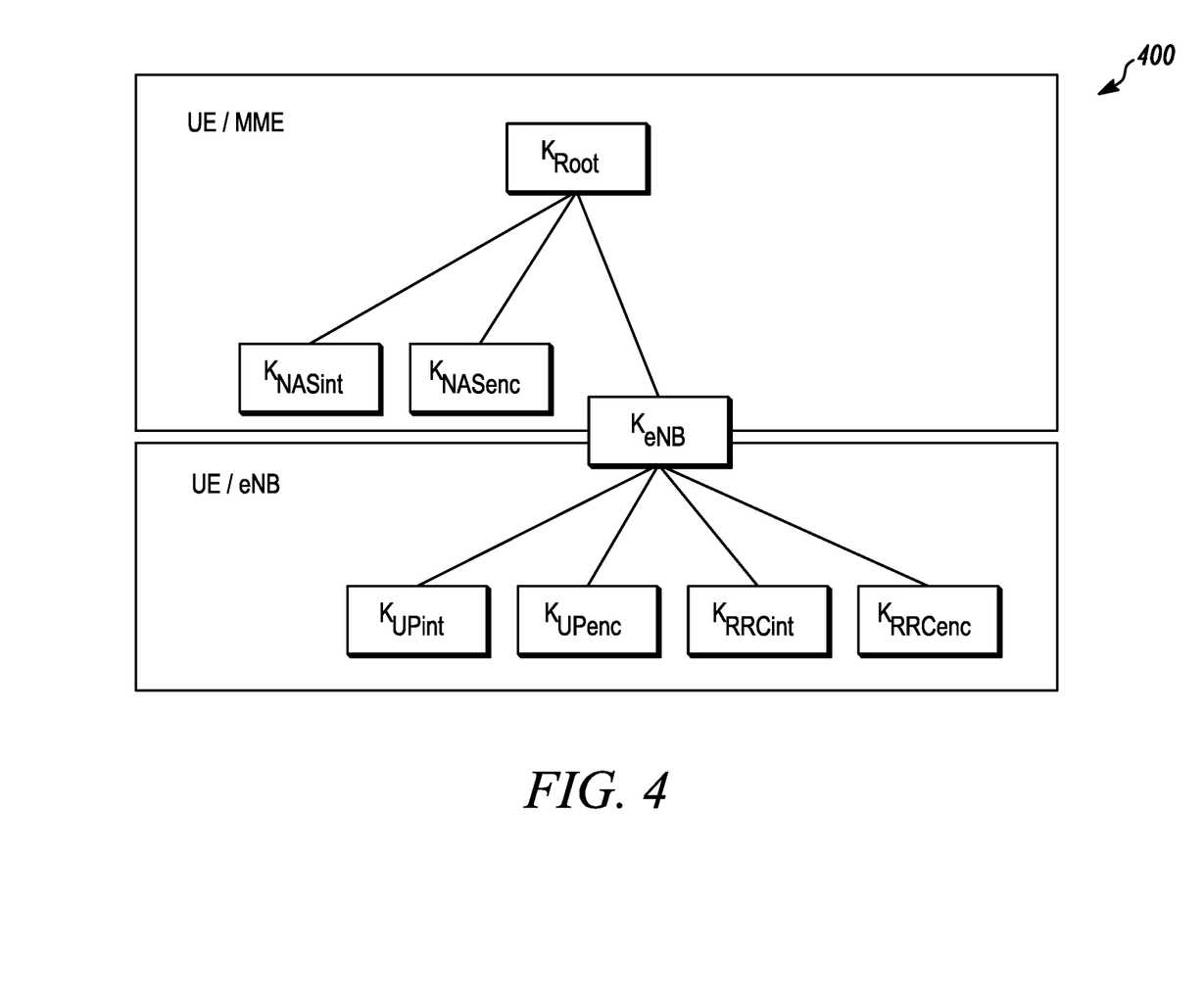
FIG. 4 illustrates a key hierarchy for Restricted Local Operator Services (RLOS) security, according to a possible embodiment.

FIG. 4 illustrates a key hierarchy 400 for RLOS security, according to a possible embodiment. As described in 355 in FIG. 3B, the MME 132 can generate a new symmetric $K_{Root}$ key based on the security capabilities of the UE 110. This symmetric key can then be used as the new master/root key. There can be several possibilities on how the $K_{NAS}$ key and $K_{eNB}$ key are derived from the $K_{Root}$ key. The $K_{Root}$ key can be already the NAS key $K_{NAS}$ or the upper level $K_{ASME}$ key where the $K_{NAS}$ key needs to be derived from. If $K_{Root}$ key is similar to $K_{ASME}$ key then the $K_{eNB}$ key can be derived in a similar way as in traditional EPS (see 33.401 [4]), while in case of $K_{Root}$ key similar to $K_{NAS}$ key, then $K_{eNB}$ key would can be derived from $K_{NAS}$ key. It can be assumed that $K_{Root}$ key is similar to $K_{ASME}$ key, but other options are also possible.

The embodiments can provide the system 100 and a method of exchanging initial credentials, such as Public Key(s) between the UE 110 and the network 130, such as the MME 132 or the AMF 135, in order to generate and securely transfer additional security credentials, such as a symmetric root key, for further derivation of derived credentials for at least NAS, access stratum (AS) and/or RRC integrity protection and/or confidentiality protection. There can be two ways the UE 110 and the MME 132 can exchange Public Key(s). The Public Key of the MME 132 can be broadcasted and the UE 110 can include its Public Key in the NAS ATTACH request. The MME 132 can initiate a new NAS Key Exchange procedure, similar to NAS SMC, but only to exchange the Public Keys. For example, the MME 132 can send the Public Key of the MME 132 to the UE 110 and the UE 110 can answer with the Public Key of the UE 110 to the MME 132, already potentially encrypted with the Public Key of the MME 132. The UE 110 can provide its security capabilities to the MME 132. The MME 132 can create a symmetric root key based on the security capabilities of the UE 110. The MME 132 can send the new symmetric root key encrypted with Public Key of the UE 110 to the UE 110 in a NAS Key exchange request. The UE 110 and the MME 132 can derive the $K_{NAS}$ key of the MME 132, the $K_{eNB}$ key from the root key in case $K_{Root}$ key is not $K_{NAS}$ key. The UE 110 can acknowledge the request already encrypted with the symmetric key. The UE 110 and the MME 132 can derive normally the radio interface keys for UP and RRC.

Figure 5:
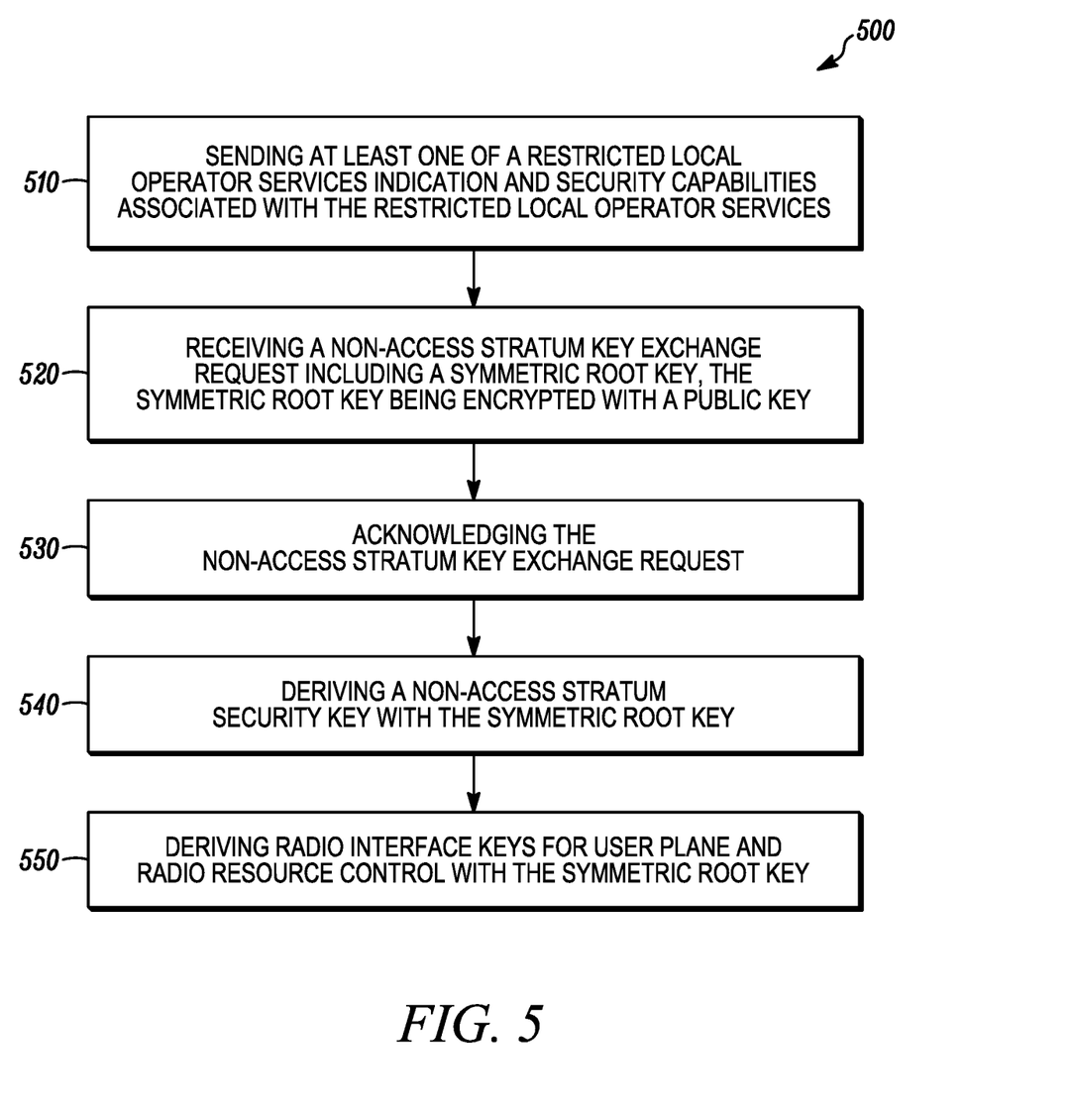
FIG. 5 illustrates an example flowchart illustrating operation of an apparatus, according to a possible embodiment.

FIG. 5 illustrates an example flowchart 500 illustrating operation of an apparatus, according to a possible embodiment. In a possible embodiment, the flowchart 500 can be implemented by the UE 110. In 510, at least one of a RLOS indication and security capabilities associated with RLOS can be sent.

In 520, a NAS Key exchange request including a symmetric root key can be received. The symmetric root key can be encrypted with a Public Key. In 530, the NAS Key exchange request can be acknowledged. In 540, a NAS security key can be derived with the symmetric root key. In 550, radio interface keys for the UP and the RRC can be derived with the symmetric root key.

In a possible embodiment, a broadcast system information message can be received. The Public Key can be a first Public Key and the broadcast system information can include the first Public Key, a NAS request message can be sent, such as the NAS ATTACH request, including at least one of the security capabilities associated with RLOS and a second Public Key. In a possible embodiment, the second Public Key can be encrypted with the first Public Key. In a possible embodiment, the first Public Key can be received in a first NAS request message, such as the NAS Key Exchange request message, and a second NAS message can be received, such as the NAS Key Exchange response message, including at least one of the security capabilities associated with RLOS and the second Public Key, in response to the receiving the first Public Key. In a possible embodiment, the second Public Key can be encrypted with the first Public Key. In a possible embodiment, a third NAS request message can be sent, such as the NAS attach request, including RLOS indication before sending the second NAS request message.

Figure 6:
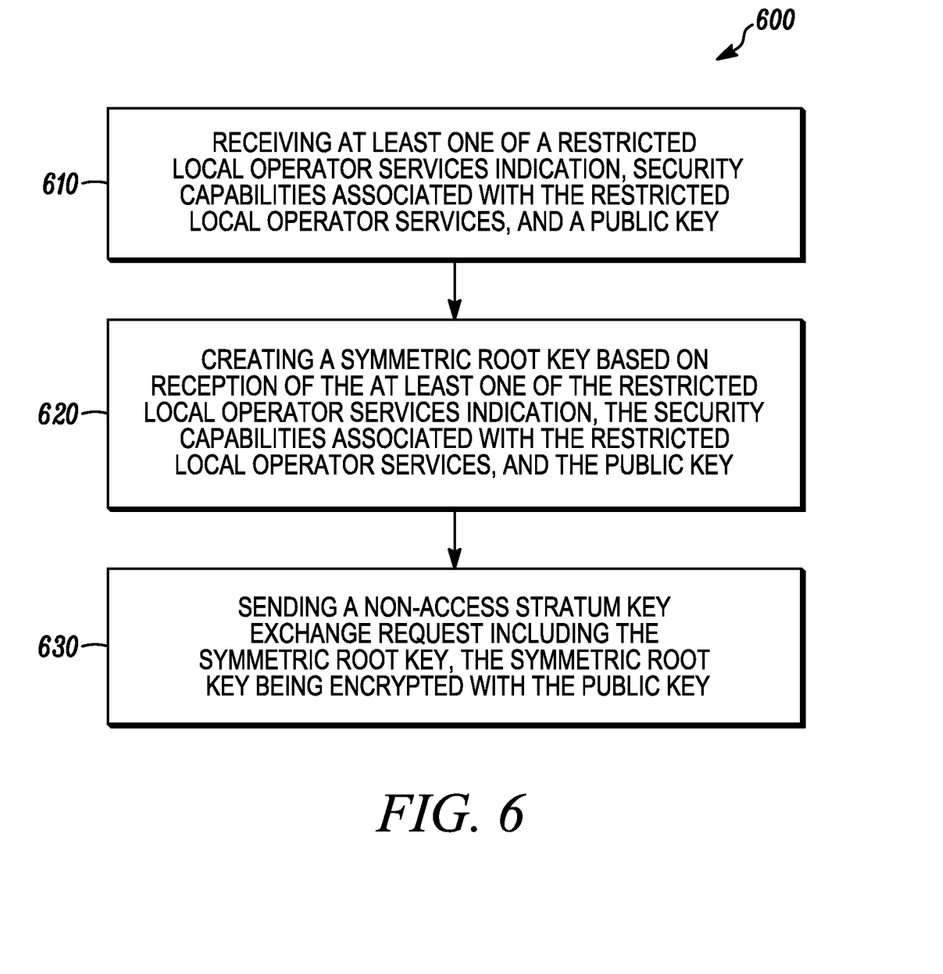
FIG. 6 illustrates an example flowchart illustrating operation of another apparatus, according to a possible embodiment.

FIG. 6 illustrates an example flowchart 600 illustrating operation of another apparatus, according to a possible embodiment. In a possible embodiment, the flowchart 600 can be implemented by the MME 132. In 610, at least one of RLOS indication, security capabilities associated with RLOS and a Public Key can be received. In a possible embodiment, the apparatus is the UE 110. In 620, a symmetric root key can be created based on reception of the at least one of RLOS indication, the security capabilities associated with the RLOS, and the Public Key. In 630, a NAS key exchange request including the symmetric root key can be sent, the symmetric root key being encrypted with the Public Key.

In a possible embodiment, a NAS attach request can be received including the at least one of RLOS indication, security capabilities associated with the RLOS, and the Public Key. In a possible embodiment, an acknowledgement can be received including the Public Key for the NAS Key exchange request. In a possible embodiment, radio interface keys for the UP and the RRC can be derived, based on the symmetric root key, and the radio interface keys can be sent. In a possible embodiment, a NAS security key can be derived, based on the symmetric root key. In a possible embodiment, a NAS Attach Accept message can be encrypted with the NAS security key. In a possible embodiment, the encrypted NAS Attach Accept message can be sent.

In a possible embodiment, the Public Key can be a first Public Key, a first NAS message and a second NAS message including the at least one of security capabilities associated with the RLOS and the second Public Key can be received, in response to the sending the first Public Key. In a possible embodiment, the second Public Key encrypted with first the Public Key can be received. In a possible embodiment, the symmetric root key can be encrypted with the second Public Key.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
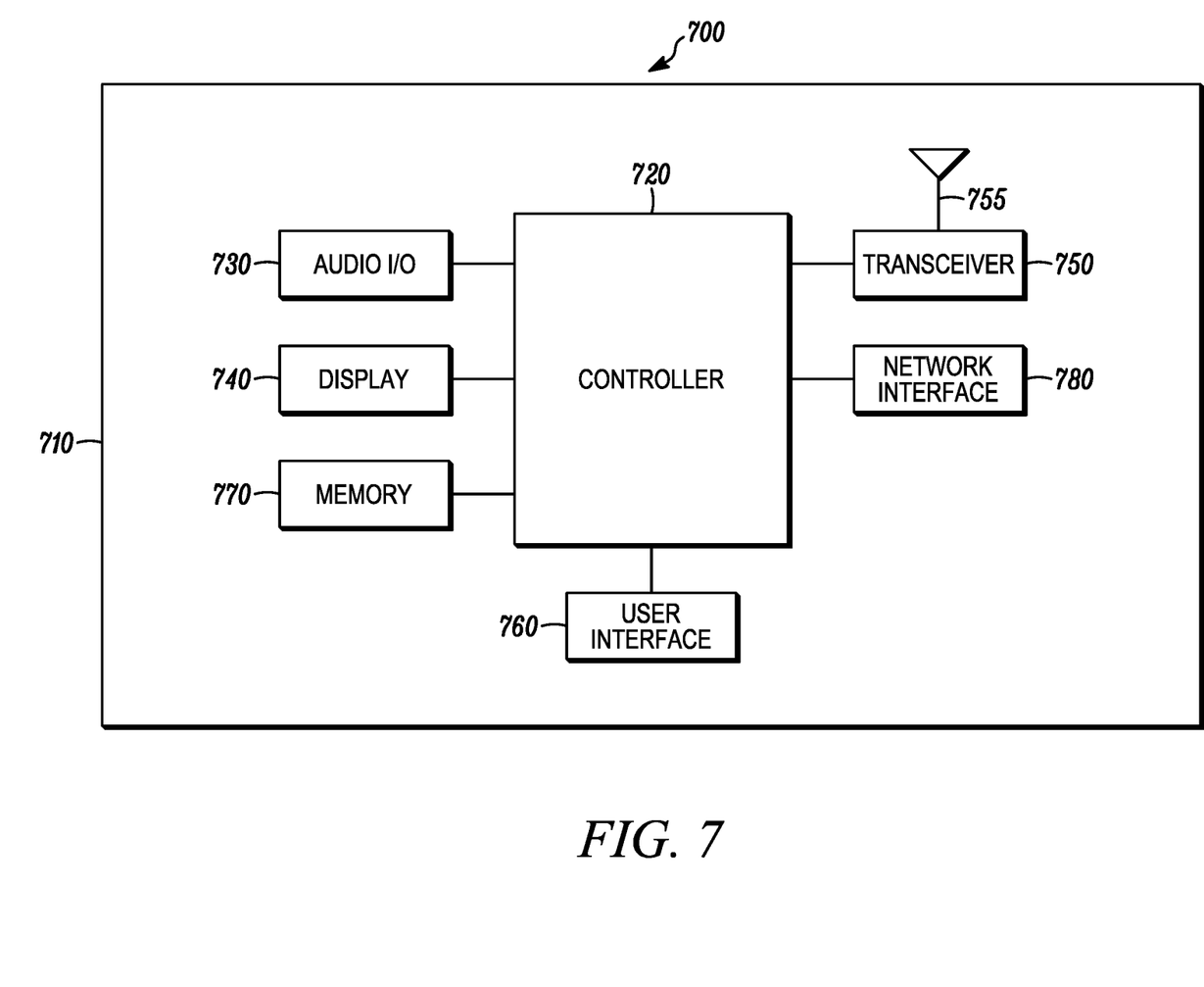
FIG. 7 is a block diagram of an example apparatus, according to a possible embodiment.

FIG. 7 is an example block diagram of an apparatus 700, such as the UE 110, the network entity 120, or any other wireless and non-wireless communication device disclosed herein, according to a possible embodiment. The apparatus 700 can include a housing 710, a controller 720 coupled to the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments.

The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random-access memory, a read only memory, an optical memory, a solid-state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

In a possible embodiment of operation of the apparatus 700 as the UE 110, the transceiver 750 can send at least one of a RLOS indication and security capabilities associated with RLOS, such as to the MME 132. The transceiver 750 can further receive a NAS Key exchange request including a symmetric root key, the symmetric root key being encrypted with a Public Key. The transceiver 750 can further acknowledge the NAS Key exchange request. The controller 720 can derive a NAS security key with the symmetric root key. The controller 720 can further derive radio interface keys for UP and RRC with the symmetric root key.

In a possible embodiment, the Public Key is a first Public Key, the transceiver 750 can further receive a broadcast system information message, the broadcast system information including the first Public Key, and can further a NAS request message, such as the NAS ATTACH request, including at least one of the security capabilities associated with RLOS and a second Public Key. In a possible embodiment, the controller 720 can further encrypt the second Public Key with the first Public Key. In a possible embodiment, the transceiver 750 can further receive the second Public Key in a first NAS request message, such as the NAS Key Exchange request message, and can further send a second NAS message, such as the NAS Key Exchange response message, including at least one of the security capabilities associated with RLOS and the second Public Key in response to the receiving the first Public Key. In a possible embodiment, the controller 720 can further encrypt the second Public Key with the first Public Key. In a possible embodiment, the transceiver 750 can further send a third NAS request message, such as the NAS attach request, including RLOS indication before sending the second NAS request message.

In a possible embodiment of operation of the apparatus 700 as the MME 132, the transceiver 750 can receive at least one of RLOS indication, security capabilities associated with RLOS and a Public Key, such as from the UE 110. The controller 720 can create a symmetric root key based on reception of the at least one of RLOS indication, the security capabilities associated with the RLOS, and the Public Key. The transceiver 750 can further send a NAS key exchange request including the symmetric root key, the symmetric root key being encrypted with the Public Key.

In a possible embodiment, the transceiver 750 can further receive a NAS attach request including the at least one of RLOS indication, security capabilities associated with the RLOS, and the Public Key. In a possible embodiment, the transceiver 750 can further receive an acknowledgement including the Public Key for the NAS Key exchange request. In a possible embodiment, the controller 720 can further derive radio interface keys for the UP and the RRC, based on the symmetric root key, wherein the transceiver 750 can send the radio interface keys. In a possible embodiment, the controller 720 can further derive a NAS security key, based on the symmetric root key, and can encrypt the a NAS Attach Accept message with the NAS security key, with the transceiver 750 can send the encrypted NAS Attach Accept message.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method, comprising:
sending at least one of a restricted local operator services indication and security capabilities associated with the restricted local operator services;
receiving a non-access stratum key exchange request including a symmetric root key, the symmetric root key being encrypted with a public key;
acknowledging the non-access stratum key exchange request;
deriving a non-access stratum security key with the symmetric root key; and deriving radio interface keys for user plane and radio resource control with the symmetric root key, wherein restricted local operator services comprise communication services provided by a wireless wide area network operator, involve at least one selected from automated or human customer service assistance, and are restricted to at least one selected from a captive portal and a particular dialed digit string.

2. The method according to claim 1, wherein the method is implemented by a user equipment.

3. The method according to claim 1, wherein the public key is a first public key, the method further comprising:
receiving a broadcast system information message, the broadcast system information including the first public key; and
sending a non-access stratum request message including at least one of the security capabilities associated with restricted local operator services and a second public key.

4. The method according to claim 3, further comprising encrypting the second public key with the first public key.

5. The method according to claim 1, wherein the public key is a first public key, the method further comprising:
receiving the first public key in a first non-access stratum request message; and
sending a second non-access stratum message including at least one of the security capabilities associated with restricted local operator services and a second public key in response to the receiving the first public key.

6. The method according to claim 5, further comprising encrypting the second public key with the first public key.

7. The method according to claim 5, further comprising sending a third non-access stratum request message including a restricted local operator services indication before sending the second non-access stratum request message.

8. An apparatus, comprising:
a transceiver that sends at least one of a restricted local operator services indication and security capabilities associated with the restricted local operator services and receives a non-access stratum key exchange request including a symmetric root key, the symmetric root key being encrypted with a public key; and
a controller that acknowledges the non-access stratum key exchange request, derives a non-access stratum security key with the symmetric root key, and derives radio interface keys for user plane and radio resource control with the symmetric root key,
wherein restricted local operator services comprise communication services provided by a wireless wide area network operator, involve at least one selected from automated or human customer service assistance, and are restricted to at least one selected from a captive portal and a particular dialed digit string.

9. The method according to claim 1, wherein sending at least one comprises sending to a network entity of a network, by a user equipment that does not have valid credentials to access the network, at least one of a restricted local operator services indication and security capabilities associated with the restricted local operator services.

10. The method according to claim 1, wherein the radio interface keys for user plane and radio resource control are derived from the symmetric root key.

11. The apparatus according to claim 8, wherein the apparatus is a user equipment.

12. The apparatus according to claim 8, wherein the public key is a first public key, wherein the transceiver further receives a broadcast system information message, the broadcast system information including the first public key, and sends a non-access stratum request message including at least one of the security capabilities associated with restricted local operator services and a second public key.

13. The apparatus according to claim 12, wherein the controller further encrypts the second public key with the first public key.

14. The apparatus according to claim 8, wherein the public key is a first public key, wherein the transceiver further receives the first public key in a first non-access stratum request message and sends a second non-access stratum message including at least one of the security capabilities associated with restricted local operator services and a second public key in response to the receiving the first public key.

15. The apparatus according to claim 14, wherein the controller further encrypts the second public key with the first public key.

16. The apparatus according to claim 14, wherein the transceiver further sends a third non-access stratum request message including a restricted local operator services indication before sending the second non-access stratum request message.

17. The apparatus according to claim 8, wherein the transceiver sends at least one of by sending, to a network entity of a network, by a user equipment that does not have valid credentials to access the network, at least one of a restricted local operator services indication and security capabilities associated with the restricted local operator services.

18. The apparatus according to claim 8, wherein the radio interface keys for user plane and radio resource control are derived from the symmetric root key.

\* \* \* \* \*